(12) United States Patent  
Chun et al.

(10) Patent No.: US 11,721,244 B2  
(45) Date of Patent: Aug. 8, 2023

(54) COVER WINDOW AND FOLDABLE DISPLAY DEVICE INCLUDING THE SAME

(71) Applicant: LG DISPLAY CO., LTD., Seoul (KR)

(72) Inventors: Changwoo Chun, Cheonan-si (KR); Jungmin Lee, Seoul (KR); Sejin Jang, Paju-si (KR); Youngjoo Park, Busan (KR)

(73) Assignee: LG Display Co., Ltd., Seoul (KR)

( * ) Notice: Subject to any disclaimer, the term of this patent is extended or adjusted under 35 U.S.C. 154(b) by 362 days.

(21) Appl. No.: 17/130,630

(22) Filed: Dec. 22, 2020

(65) Prior Publication Data

US 2021/0201712 A1 Jul. 1, 2021

(30) Foreign Application Priority Data

Dec. 30, 2019 (KR) .......................... 10-2019-0177976

(51) Int. Cl.
- *G09F 9/30* (2006.01)
- *G06F 1/16* (2006.01)

(Continued)

(52) U.S. Cl.
CPC ............... *G09F 9/301* (2013.01); *B32B 3/30* (2013.01); *B32B 7/14* (2013.01); *B32B 27/08* (2013.01);

(Continued)

(58) Field of Classification Search
CPC .... B32B 3/28; B32B 3/30; B32B 7/14; B32B 27/08; B32B 2457/00; B32B 2255/26;

(Continued)

(56) References Cited

U.S. PATENT DOCUMENTS 9,661,114 B2 5/2017 Jeong et al.  
10,696,011 B2 6/2020 Kim  
(Continued)

FOREIGN PATENT DOCUMENTS

CN 104658435 A 5/2015  
CN 106450024 A 2/2017  
(Continued)

OTHER PUBLICATIONS

Office Action dated Jul. 20, 2022, issued in corresponding Chinese Patent Application No. 202011413319.9.

(Continued)

*Primary Examiner* — Catherine A. Simone  
(74) *Attorney, Agent, or Firm* — Morgan, Lewis & Bockius LLP (57) ABSTRACT

Provided is a cover window. The cover window includes a substrate layer. The cover window further includes a hard-coating layer on the substrate layer. The cover window further includes a protective film disposed on the hard-coating layer and including a base film and a plurality of protrusions protruding from the base film. The cover window further includes an adhesive layer disposed on surfaces of the plurality of protrusions and bonding the hard-coating layer and the protective film. The protective film includes a first area and second areas disposed on both sides of the first area. The plurality of protrusions are disposed in the first area. The plurality of protrusions have a shape in which the protrusions disposed on one side and the protrusions disposed on the other side are symmetrical to each other with respect to a central line of the first area.

14 Claims, 6 Drawing Sheets

(51) Int. Cl.
  *B32B 3/30* (2006.01)
  *B32B 7/14* (2006.01)
  *B32B 27/08* (2006.01)
(52) U.S. Cl.
  CPC ........ *G06F 1/1616* (2013.01); *B32B 2255/26* (2013.01); *B32B 2457/20* (2013.01)
(58) Field of Classification Search
  CPC ............... G09F 9/301; G02F 1/133302; G02F 1/133305; G06F 1/1616
  See application file for complete search history.

(56) References Cited

U.S. PATENT DOCUMENTS

| | | | |
|---|---|---|---|
| 2016/0014881 | A1 | 1/2016 | Jung et al. |
| 2017/0042047 | A1 | 2/2017 | Oh |
| 2018/0136371 | A1 | 5/2018 | Kim et al. |
| 2018/0234530 | A1 | 8/2018 | Lee et al. |
| 2019/0181364 | A1 | 6/2019 | Jeong |

FOREIGN PATENT DOCUMENTS

| | | |
|---|---|---|
| CN | 109559639 A | 4/2019 |
| EP | 3425431 A2 | 1/2019 |
| KR | 10-2018-0037102 A | 4/2018 |
| KR | 10-20180053446 A | 5/2018 |
| KR | 10-2019-0044267 A | 4/2019 |

OTHER PUBLICATIONS

Extended European Search Report dated May 21, 2021, issued in corresponding European Patent Application No. 20214778.1.
Extended European Search Report dated Apr. 14, 2023, issued in corresponding European Patent Application No. 23151427.4.

COVER WINDOW AND FOLDABLE DISPLAY DEVICE INCLUDING THE SAME

CROSS-REFERENCE TO RELATED APPLICATIONS

This application claims the priority benefit of Korean Patent Application No. 10-2019-0177976 filed on Dec. 30, 2019, in the Korean Intellectual Property Office, the disclosure of which is incorporated herein by reference.

BACKGROUND

Technical Field

The present disclosure relates to a cover window and a foldable display device including the same, and more particularly, to a cover window capable of rework and having excellent folding characteristics, and a foldable display device including the same.

Discussion of the Related Art

Display devices used for a computer monitor, a TV, a mobile phone, and the like include an organic light-emitting display (OLED) that emits light by itself, a liquid-crystal display (LCD) that requires a separate light source, and the like.

Such display devices are being applied to more and more various fields including not only a computer monitor and a TV, but personal mobile devices, and thus, display devices having a reduced volume and weight while having a wide display area are being studied.

Recently, a foldable display device that can be freely folded and unfolded by forming a light emitting element, lines, and the like on a flexible substrate formed of a flexible material such as plastic or the like, has attracted attention as a next-generation display device.

SUMMARY

Accordingly, embodiments of the present disclosure are directed to a cover window and a foldable display device including the same that substantially obviates one or more of the problems due to limitations and disadvantages of the related art.

An aspect of the present disclosure is to provide a cover window capable of rework, and a foldable display device including the same.

Another aspect of the present disclosure is to provide a cover window capable of rework and allowing for improvements in folding characteristics, and a foldable display device including the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

According to an aspect of the present disclosure, there is provided a cover window. The cover window includes a substrate layer. The cover window further includes a hard-coating layer on the substrate layer. The cover window further includes a protective film disposed on the hard-coating layer and including a base film and a plurality of protrusions protruding from the base film. The cover window further includes an adhesive layer disposed on surfaces of the plurality of protrusions and bonding the hard-coating layer and the protective film. The protective film includes a first area and second areas disposed on both sides of the first area. The plurality of protrusions are disposed in the first area. The plurality of protrusions have a shape in which the protrusions disposed on one side and the protrusions disposed on the other side are symmetrical to each other with respect to a central line of the first area.

According to another aspect of the present disclosure, there is provided a foldable display device. The foldable display device includes the cover window. The foldable display device further includes a display panel disposed under the cover window.

Other detailed matters of the exemplary embodiments are included in the detailed description and the drawings.

According to the present disclosure, a rework of a cover window may be facilitated by disposing a plurality of protrusions on a protective film of the cover window.

According to the present disclosure, by differing adhesive strength of an adhesive layer used for attaching a protective film of a cover window for each area, rework may be facilitated and at the same time, the adhesive strength may be maintained to thereby improve folding characteristics.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, the present disclosure will be described in detail with reference to accompanying drawings.

Figure 1:
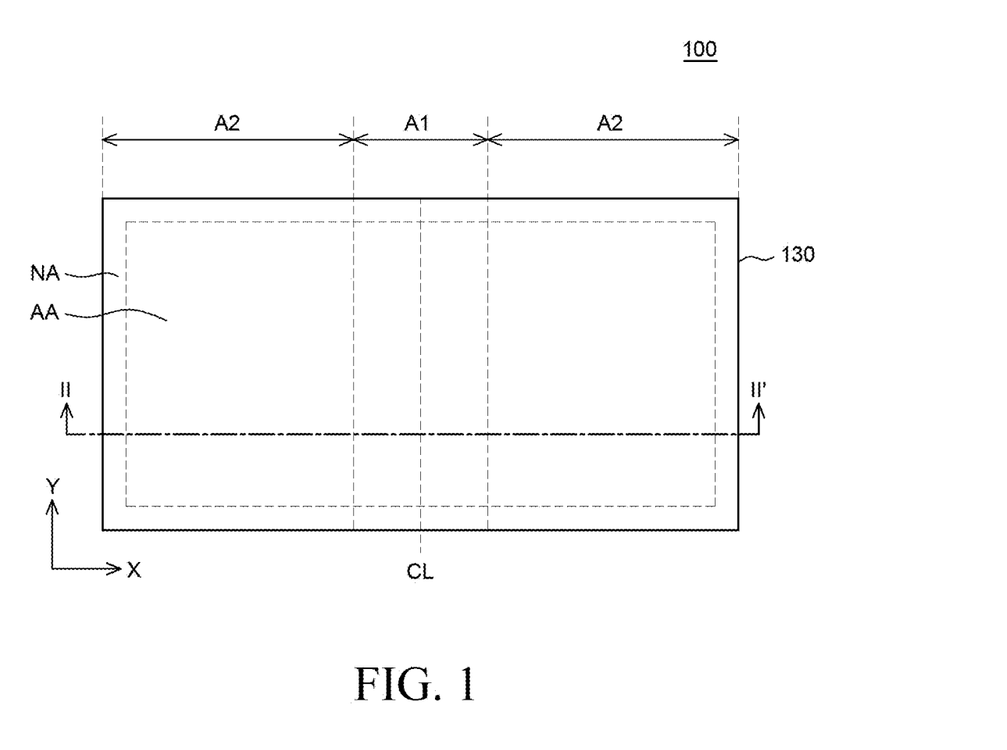
FIG. 1 is a plan view of a cover window according to an exemplary embodiment of the present disclosure.
Figure 2:
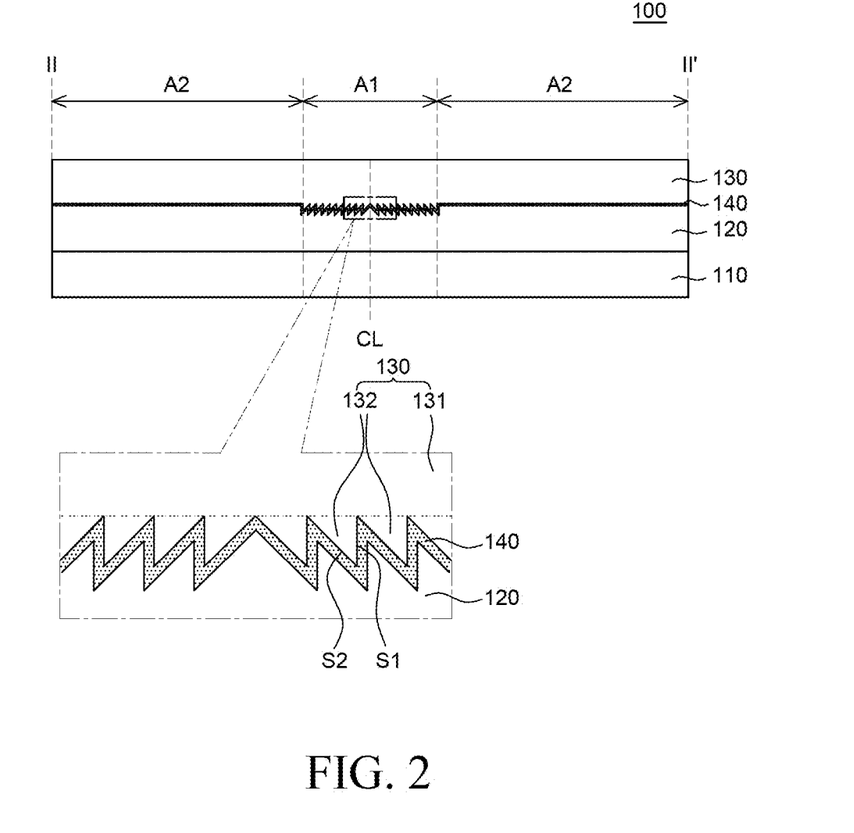
FIG. 2 is a cross-sectional view taken along line II-II of FIG. 1.

FIG. 1 is a plan view of a cover window according to an exemplary embodiment of the present disclosure. FIG. 2 is a cross-sectional view taken along line II-II of FIG. 1. Referring to FIGS. 1 and 2, a cover window 100 includes a substrate layer 110, a hard-coating layer 120, a protective film 130 and an adhesive layer 140.

Referring to FIG. 2, the substrate layer 110 is configured to provide rigidity in the cover window 100. When the cover window 100 is used for a foldable display device, a polarizing plate, a touch panel, a display panel and the like, under the cover window 100, may be protected from external impacts, moisture, heat, and the like. The substrate layer 110 may be formed of a material having impact resistance and light transmittance properties. For example, the substrate layer 110 is a thin film formed of a plastic material such as polymethylmethacrylate (PMMA), polyimide (PI), polyethylene terephthalate (PET), polyamide (PA), and the like, but is not limited thereto.

The substrate layer 110 may be formed of a material of a high tensile Young's modulus which has a high modulus value, that is, a material having high hardness, in order to reduce cracks due to external impacts. In the case of a material having a high modulus value, it does not bend and may break when a foldable display device is folded. However, even in the case of a material having a high modulus value, it can be folded when a thickness thereof is equal to or less than a predetermined thickness. Therefore, the substrate layer 110 may have a very small thickness. For example, the substrate layer 110 may be a thin plastic film, but is not limited thereto.

Referring to FIG. 2, the protective film 130 is disposed on the substrate layer 110. The protective film 130 may be disposed on an outermost portion of the cover window 100 and may protect the substrate layer 110 from being damaged from external impacts.

The protective film 130 may be formed of a material such as polyethylenenaphthalate (PEN), polyimide (PI), epoxy-based or acrylic-based materials, but is not limited thereto. In addition, a transparency of the protective film 130 may be 90% or more, and a haze of the protective film 130 may be 1% or less. In addition, the protective film 130 may be additionally coated to secure surface properties. For example, the protective film 130 may be additionally coated such that the surface hardness is 3B or more and for an anti-finger (AF) function, a contact angle is 100 degrees. However, the present disclosure is not limited thereto.

Referring to FIG. 1, the protective film 130 includes a first area A1 and second areas A2 disposed on both sides of the first area A1. As described later, when the cover window 100 is used in a foldable display device, the first area A1 may correspond to a folding area, and the second areas A2 may correspond to non-folding areas. In addition, a central line CL of the first area A1 may be defined as a line passing through an intermediate point of a width of the first area A1 in an X-axis direction, as illustrated in FIGS. 1 and 2, and may correspond to a folding axis which is an axis along which the folding area is folded. In FIG. 1, the protective film 130 is illustrated as including one first area A1. However, when a foldable display device to which the cover window 100 is applied includes a plurality of folding areas, the first area A1 may be provided in plural numbers.

The protective film 130 may include a base film 131 and a plurality of protrusions 132 protruding from the base film 131. The base film 131 is an upper portion of the protective film 130, and the plurality of protrusions 132 are portions protruding downward from the base film 131. The base film 131 and the plurality of protrusions 132 may be integrally formed. Each of the plurality of protrusions 132 may include a first surface S1 perpendicular to the base portion 131 and a second surface S2 inclined with respect to the first surface S1 and the base film 131. That is, as shown in FIG. 2, the first surface S1 extends from the base film 131 to be perpendicular thereto, and the second surface S2 extends from the base film 131 to be inclined with respect thereto. As a result, the second surface S2 may also be inclined with respect to the first surface S1. Accordingly, a cross-sectional shape of each of the plurality of protrusions 132 may be a right-angled triangular shape.

In some embodiments, the first surface S1 may not be perpendicular to the base film 131. In this case, an angle formed by the first surface S1 and the base film 131 may be greater than an angle formed by the second surface S2 and the base film 131. That is, an inclination of the first surface S1 with respect to the base film 131 may be greater than an inclination of the second surface S2 with respect to the base film 131. Thus, in a cross-sectional view, a length of the first surface S1 may be smaller than a length of the second surface S2. That is, an area of the first surface S1 may be smaller than an area of the second surface S2.

The plurality of protrusions 132 may be disposed in the first area A1. That is, the plurality of protrusions 132 may be disposed in the first area A1 so that when the cover window 100 is used in a foldable display device, they can be disposed in the folding area.

The plurality of protrusions 132 may have a shape in which the protrusions 132 disposed on one side and the protrusions 132 disposed on the other side are symmetrical to each other with respect to the central line CL of the first area A1. That is, as illustrated in FIG. 2, a shape of the protrusions 132 located on the left side and a shape of the protrusions 132 located on the right side may be symmetrical to each other with respect to the central line CL of the first area A1. In this case, each of the plurality of protrusions 132 may have a shape in which the second surface S2 is closer to the central line CL as compared to the first surface S1.

Referring to FIG. 2, the hard-coating layer 120 is disposed between the substrate layer 110 and the protective film 130. The hard-coating layer 120 is used to additionally secure excellent flexibility, abrasion resistance, and surface hardness to the substrate layer 110. The hard-coating layer 120 may be formed of an organic material such as an acryl-based or epoxy-based material, or may be an organic-inorganic hybrid coating layer in which an inorganic material is contained in an organic material, but is not limited thereto.

A surface of the hard-coating layer 120 may have a shape corresponding to a shape of a surface of the protective film 130. That is, as shown in FIG. 2, the hard-coating layer 120 may include recesses in portions thereof corresponding to the plurality of protrusions 132 of the protective film 130, and may include protrusions in portions thereof corresponding to spaces between the plurality of protrusions 132 of the protective film 130.

Referring to FIG. 2, the adhesive layer 140 is disposed between the protective film 130 and the hard-coating layer 120. The adhesive layer 140 may be disposed on the surface of the protective film 130 to bond the hard-coating layer 120 and the protective film 130. For example, in the first area A1, the adhesive layer 140 may be disposed on surfaces of the plurality of protrusions 132 of the protective film 130 to bond the hard-coating layer 120 and the protective film 130.

An UV curing resin may be used for the adhesive layer 140. For example, for the adhesive layer 140, an acryl-based resin may be used, and an OCR (optical clear resin) capable of controlling adhesive strength through UV curing may be used. The adhesive layer 140 may have adhesion strength allowing the protective film 130 to be easily separated in a rework process of the cover window 100, that is, a replacement process of the cover window 100.

In the case of a cover window which is applied to a foldable display device, the cover window also needs to be folded since the foldable display device should be folded. Accordingly, a cover window formed of a plastic material is being used rather than a cover window formed of a glass material. However, when a foldable display device using the cover window formed of a plastic material is used for a predetermined period of time, the cover window may crack and scratches may occur therein. In a case in which the cover window where the cracks and scratches occur is continuously used, there is a problem that a user cannot properly recognize an image displayed on the foldable display device. Accordingly, there is a need for reworking, that is, replacing the cover window used in the foldable display device. However, when the adhesive strength of the adhesive layer used to bond the protective film of the cover window is high, it is difficult to rework the protective film. When the adhesive strength of the adhesive layer is low, peeling-off may occur in a repetitive folding process of the foldable display device. Accordingly, there is a need for a cover window capable of rework while having folding characteristics.

Accordingly, the cover window 100 according to an exemplary embodiment of the present disclosure may be used for a foldable display device, and may be reworked after being used for a predetermined period of time. Specifically, the protective film 130 of the cover window 100 includes the plurality of protrusions 132 in the first area A1 corresponding to the folding area of the foldable display device. In addition, the plurality of protrusions 132 disposed on both sides have a symmetrical shape with respect to the central line CL of the first area A1. In this case, each of the plurality of protrusions 132 may include a first surface S1 perpendicular to the base film 131 and a second surface S2 inclined with respect to the base film 131. Thus, in the cover window 100 according to an exemplary embodiment of the present disclosure, when the foldable display device is folded, even in a case in which the adhesive strength of the adhesive layer 140 is low, it is feasible to prevent shear force through the shape of the plurality of protrusions 132 of the protective film 130, thereby inhibiting the protective film 130 from being peeled off. Specifically, when the adhesive strength of the adhesive layer 140 is lowered so as to facilitate rework, a problem that the protective film 130 is peeled off during repeated folding may occur. However, since the plurality of protrusions 132 of the protective film 130 include the first surfaces S1 extending from the base film 131 in a direction perpendicular thereto, it may be feasible to prevent shear force during a folding operation. In addition, the plurality of protrusions 132 may include the second surface S2 extending inclinedly from the base film 131, and the second surfaces S2 thereof may be closer to the central line CL as compared to the first surfaces S1. Accordingly, the second surfaces S2 may allow the protective film 130 to easily slip when the protective film 130 is stretched during a folding operation. Accordingly, when the cover window 100 according to an exemplary embodiment of the present disclosure is applied to a foldable display device, it may be easily reworked, simultaneously with improvements in folding characteristics.

Figure 3:
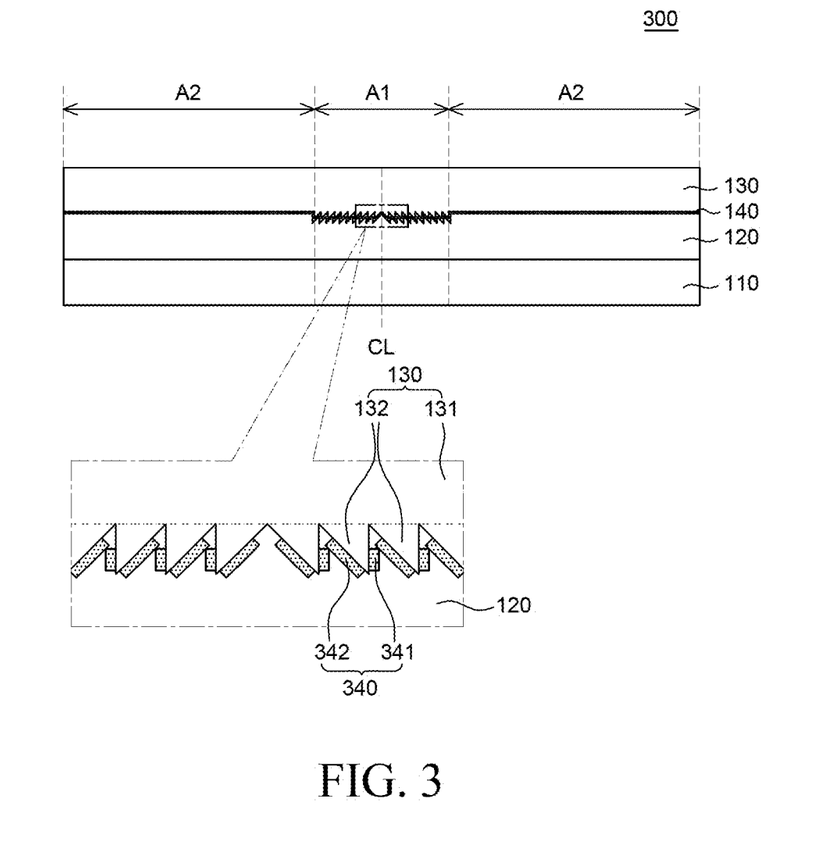
FIG. 3 is a cross-sectional view of a cover window according to another exemplary embodiment of the present disclosure.

FIG. 3 is a cross-sectional view of a cover window according to another exemplary embodiment of the present disclosure. A cover window 300 shown in FIG. 3 is different from the cover window 100 described with reference to FIGS. 1 and 2, only in terms of an adhesive layer 340, and other configurations thereof are substantially the same as those of the cover window 100 described with reference to FIGS. 1 and 2. Thus, a redundant description will be omitted.

Referring to FIG. 3, the adhesive layer 340 may include a plurality of first adhesive layers 341 and a plurality of second adhesive layers 342. The plurality of first adhesive layers 341 may be disposed on the first surfaces S1 of the plurality of protrusions 132, and the plurality of second adhesive layers 342 may be disposed on the second surfaces S2 of the plurality of protrusions 132. In addition, the adhesive layer 340 may also be disposed in the second areas A2 of the protective film 130. Accordingly, the plurality of first adhesive layers 341 and the plurality of second adhesive layers 342 may be disposed to be separated from each other.

Adhesive strength of the plurality of first adhesive layers 341 may be greater than adhesive strength of the plurality of second adhesive layers 342. The plurality of first adhesive layers 341 of the adhesive layer 340 are used to bond the first surfaces S1 of the plurality of protrusions 132 and the hard-coating layer 120, and need to perform a function of preventing shear force so that the protective film 130 is not peeled off during a folding operation. On the other hand, the plurality of second adhesive layers 342 of the adhesive layer 340 are used to bond the second surfaces S2 of the plurality of protrusions 132 and the hard-coating layer 120, and need to allow for good slip properties in a horizontal direction during a folding operation so that the protective film 130 easily slips when the protective film 130 is stretched during the folding operation. Therefore, the adhesive strength of the plurality of first adhesive layers 341 may be greater than that of the plurality of second adhesive layers 342. For example, the adhesive strength of the plurality of first adhesive layers 341 may be 300 gf/inch and the adhesive strength of the plurality of second adhesive layers 342 may be 30 gf/inch to 50 gf/inch, but the present disclosure is not limited thereto.

The plurality of first adhesive layers 341 may be attached to a part of the first surfaces S1 having an area smaller than an area of the first surfaces S1. As described above, the plurality of first adhesive layers 341 may have a relatively high adhesive strength to prevent the protective film 130 from being peeled off during a folding operation. Accordingly, when adhesive areas of the plurality of first adhesive layers 341 are relatively large, the protective film 130 may not be easily replaced when the cover window 300 is reworked. Accordingly, the plurality of first adhesive layers 341 may be attached to the part of the first surfaces S1 having the area smaller than the area of the first surfaces S1.

In the cover window 300 according to another exemplary embodiment of the present disclosure, the adhesive layer 340 used for bonding the protective film 130 and the hard-coating layer 120 has a different adhesive strength for each area, so that rework may be easily performed, simultaneously with improvements in folding characteristics. Specifically, in order to prevent shear force so that the protective film 130 is not peeled off during a folding operation, the adhesive strength of the first adhesive layers 341 for bonding the first surfaces S1 of the plurality of protrusions 132 and the hard-coating layer 120 may be relatively large. On the other hand, in order to allow the protective film 130 to easily slip when the protective film 130 is stretched during a folding operation, the adhesive strength of the second adhesive layers 342 for bonding the second surfaces S2 of the plurality of protrusions 132 and the hard-coating layer 120 may be relatively small. Accordingly, when the cover window 300 according to another exemplary embodiment of the present disclosure is applied to a foldable display device, rework may be easily performed, simultaneously with improvements in folding characteristics. In addition, in the cover window 300 according to another exemplary embodiment of the present disclosure, since the plurality of first adhesive layers 341 are attached to the part of the first surfaces S1 having the area smaller than the area of the first surfaces S1, a rework process may be further facilitated.

Meanwhile, in a rework process for the cover window 300, the cover window 300 is not entirely replaced, and only the protective film 130 and the adhesive layer 340 are replaced. Thus, in terms of actual products, a product formed of only the protective film 130 and the adhesive layer 340 may be configured for sale.

Figure 4:
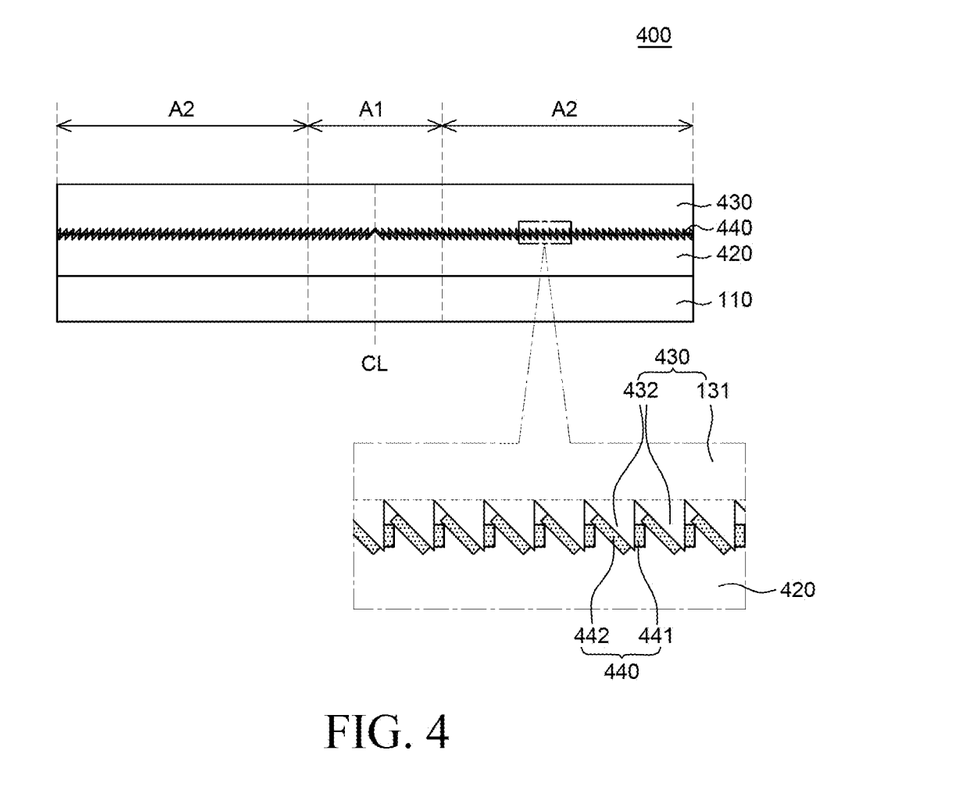
FIG. 4 is a cross-sectional view of a cover window according to still another exemplary embodiment of the present disclosure.

FIG. 4 is a cross-sectional view of a cover window according to still another exemplary embodiment of the present disclosure. A cover window 400 shown in FIG. 4 is different from the cover window 300 described with reference to FIG. 3, only in terms of a protective film 430, adhesive layers 440, and a hard-coating layer 420, and other configurations thereof are substantially the same as those of the cover window 300 described with reference to FIG. 3. Thus, a redundant description will be omitted.

Referring to FIG. 4, a plurality of protrusions 432 are disposed in both a first area A1 and second areas A2. That is, when the cover window 400 is applied to a foldable display device, the plurality of protrusions 432 may be disposed to correspond to the entirety of folding and non-folding areas of the foldable display device.

The plurality of protrusions 432 may have a shape in which the protrusions 432 disposed on one side and the protrusions 432 disposed on the other side are symmetrical to each other with respect to the central line CL of the first area A1. Accordingly, not only the plurality of protrusions 432 disposed in the first area A1 but also the plurality of protrusions 432 disposed in the second areas A2 may have a symmetrical cross-sectional shape with respect to the central line CL of the first area A1.

A plurality of the adhesive layers 440 may include a plurality of first adhesive layers 441 and a plurality of second adhesive layers 442. In this case, the plurality of first adhesive layers 441 may be disposed on the first surfaces S1 of the plurality of protrusions 432 disposed in the first area A1 and the second areas A2, and the plurality of second adhesive layers 442 may be disposed on the second surfaces S2 of the plurality of protrusions 432 disposed in the first area A1 and the second areas A2. Also, adhesive strength of the plurality of first adhesive layers 441 may be greater than that of the plurality of second adhesive layers 442.

A surface of the hard-coating layer 420 may have a shape corresponding to a shape of a surface of the protective film 430. That is, as shown in FIG. 4, the hard-coating layer 420 may include recesses in portions thereof corresponding to the plurality of protrusions 432 of the protective film 430, and the hard-coating layer 420 may include protrusions in portions thereof corresponding to spaces between the plurality of protrusions 432 of the protective film 430.

In the cover window 400 according to another exemplary embodiment of the present disclosure, the plurality of protrusions 432 of the protective film 430 may be disposed in both the first area A1 and the second areas A2. Accordingly, in the cover window 400 according to another exemplary embodiment of the present disclosure, rework may be easily performed, simultaneously with improvements in folding characteristics. Specifically, when the cover window 400 is applied to a foldable display device, as the plurality of protrusions 432 are also disposed in the second areas A2 corresponding to non-folding areas, the plurality of protrusions 432 disposed in the second areas may also prevent shear force so that the protective film 430 is not peeled off during a folding operation. And, when the protective film 430 is stretched during a folding operation, the plurality of protrusions 432 disposed in the second area A2 may allow the protective film 430 to easily slip.

Figure 5:
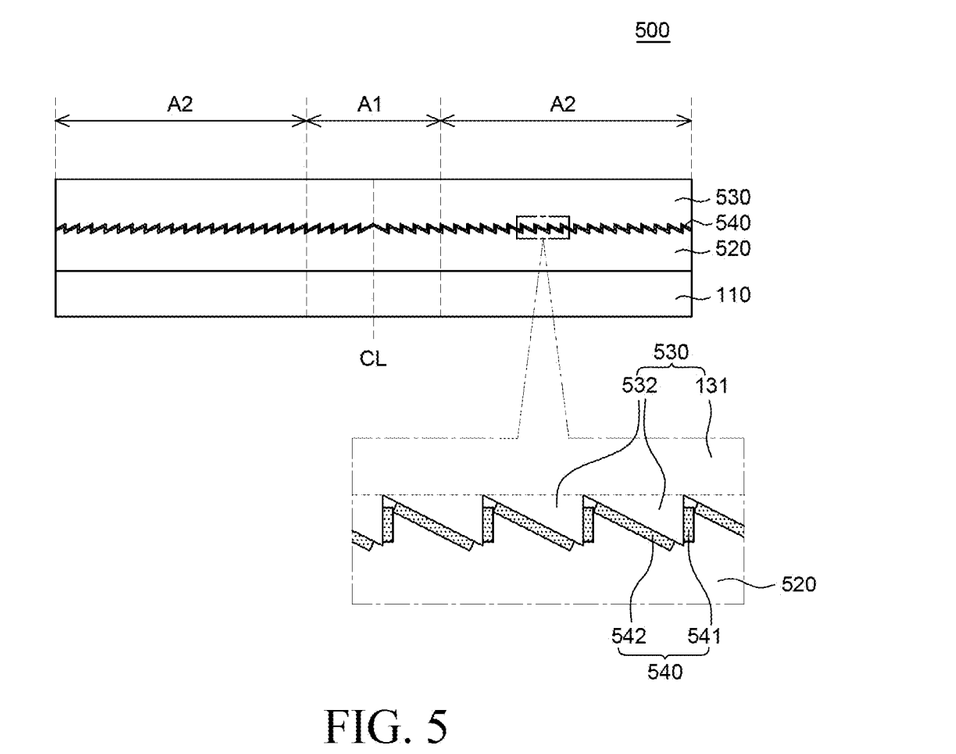
FIG. 5 is a cross-sectional view of a cover window according to still another exemplary embodiment of the present disclosure.

FIG. 5 is a cross-sectional view of a cover window according to still another exemplary embodiment of the present disclosure. A cover window 500 illustrated in FIG. 5 is different from the cover window 400 described with reference to FIG. 4, only in terms of a protective film 530, adhesive layers 540, and a hard-coating layer 520, and other configurations thereof are substantially the same as those of the cover window 400 described with reference to FIG. 4. Thus, a redundant description will be omitted.

Referring to FIG. 5, a plurality of protrusions 532 are disposed in both a first area A1 and second areas A2. That is, when the cover window 500 is applied to a foldable display device, the plurality of protrusions 532 may be disposed to correspond to the entirety of folding and non-folding areas of the foldable display device.

In this case, an angle of a second surface S2 of each of the plurality of protrusions 532 with respect to the base film 531 may be further reduced. Thus, in a cross-sectional view, a height of the protrusion 532 in a direction vertical to the base film 531 may be smaller than a length of the protrusion 532 in a direction parallel to the base film 531. Thus, as shown in FIG. 5, a cross-sectional shape of each of the plurality of protrusions 532 may be a right-angled triangular shape in which a length of a horizontal side is larger than a length of a vertical side. However, the present disclosure is not limited thereto.

A plurality of the adhesive layers 540 may include a plurality of first adhesive layers 541 and a plurality of second adhesive layers 542. In this case, the plurality of first adhesive layers 541 may be disposed on the first surfaces S1 of the plurality of protrusions 532 disposed in the first area A1 and the second areas A2, and the plurality of second adhesive layers 542 may be disposed on the second surfaces S2 of the plurality of protrusions 532 disposed in the first area A1 and the second areas A2. In addition, adhesive strength of the plurality of first adhesive layers 541 may be greater than that of the plurality of second adhesive layers 542.

A surface of the hard-coating layer 520 may have a shape corresponding to a shape of a surface of the protective film 530. That is, as shown in FIG. 5, the hard-coating layer 520 may include recesses in portions thereof corresponding to the plurality of protrusions 532 of the protective film 530, and the hard-coating layer 520 may include protrusions in portions thereof corresponding to spaces between the plurality of protrusions 532 of the protective film 530.

In the cover window 500 according to another exemplary embodiment of the present disclosure, the adhesive layers 540 used for bonding the protective film 530 and the hard-coating layer 520 have different levels of adhesive strength for respective areas. At the same time, the areas of the first surfaces S1 of the plurality of protrusions 532 extending in a direction perpendicular to the base film 531 may be decreased, and the areas of the second surfaces S2 of the plurality of protrusions 532 extending inclinedly with respect to the base film 531 may be increased. Accordingly, an area of the plurality of first adhesive layers 541 disposed on the first surfaces S1 of the plurality of protrusions 532 may decrease, and an area of the plurality of second adhesive layers 542 disposed on the second surfaces S2 of the plurality of protrusions 532 may increase. Accordingly, in the cover window 500 according to another exemplary embodiment of the present disclosure, rework may be easily performed, simultaneously with improvements in folding characteristics. Specifically, the adhesive strength of the first adhesive layers 541 for bonding the first surfaces S1 of the plurality of protrusions 532 and the hard-coating layer 520 may be relatively high, in order to prevent the shear force so that the protective film 530 is not peeled off during a folding operation. On the other hand, the adhesive strength of the second adhesive layers 542 for bonding the second surfaces S2 of the plurality of protrusions 532 and the hard-coating layer 520 may be relatively low in order to allow the protective film 530 to easily slip when the protective film 530 is stretched during a folding operation. In addition, in the cover window 500 according to another exemplary embodiment of the present disclosure, the areas of the first surfaces S1 of the plurality of protrusions 532 decrease in such a manner that rework is relatively easily performed. Accordingly, a phenomenon in which the protective film 530 is not easily separated by the plurality of first adhesive layers 541 having a relatively high adhesive strength may be minimized. In addition, the areas of the second surfaces S2 of the plurality of protrusions 532 increase, so that the protective film 530 may be easily slipped by the plurality of second adhesive layers 542 having a relatively low adhesive strength, when the protective film 530 is stretched during a folding operation. Accordingly, the cover window 500 according to another exemplary embodiment of the present disclosure may be easily reworked while improving folding characteristics when it is applied to a foldable display device.

Figure 6:
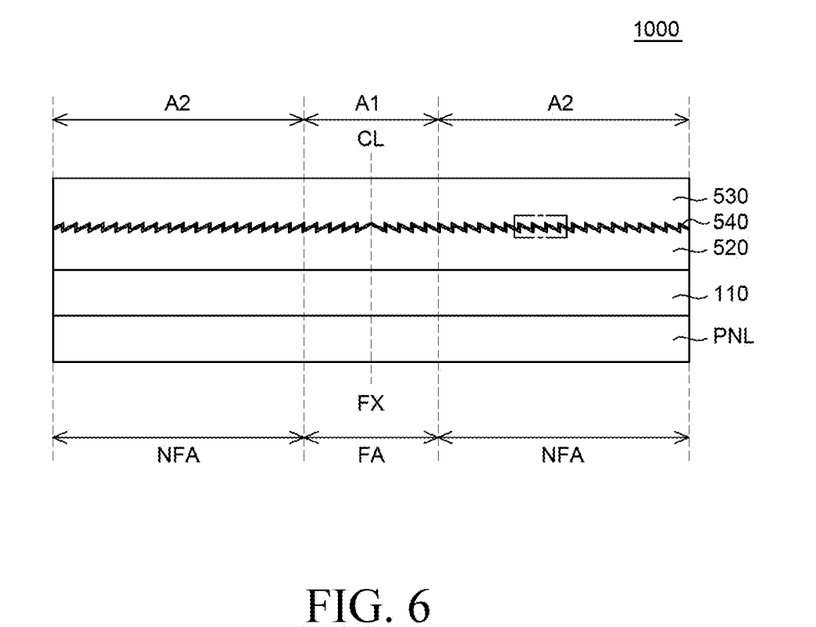
FIG. 6 is a cross-sectional view of a foldable display device according to an exemplary embodiment of the present disclosure.

FIG. 6 is a cross-sectional view of a foldable display device according to an exemplary embodiment of the present disclosure. Referring to FIG. 6, a foldable display device 1000 includes a display panel PNL and the cover window 500. FIG. 6 illustrates that the cover window 500 illustrated in FIG. 5 is included in the foldable display device 1000, for convenience of description, but the present disclosure is not limited thereto. The cover windows 100, 300, 400, and 500 according to various exemplary embodiments of the present disclosure described with reference to FIGS. 1 to 5 may be included in the foldable display device 1000.

Referring to FIG. 6, the display panel PNL is disposed under the cover window 500. The display panel PNL is a panel on which an image is implemented. In the display panel PNL, a light emitting element for implementing the image, and circuits, lines, and components for driving the light emitting element may be disposed. The display panel PNL may be a flexible display panel PNL. For example, the display panel PNL may be a foldable display panel PNL that can be folded, but is not limited thereto.

The display panel PNL includes a display area and a non-display area. Also, the display panel PNL includes a folding area FA and a non-folding area NFA. The areas of the display panel PNL may be classified depending on whether an image is displayed or not, and the areas of the display panel PNL may be classified depending on whether to be folded or not. A specific area of the display panel PNL may be defined depending on whether to display an image or not and whether to be folded or not. For example, a specific area of the display panel PNL may be a display area and at the same time, may be a folding area FA.

The display area is an area for displaying an image, and in the display area, a plurality of sub-pixels including a light emitting element for displaying an image and a circuit unit for driving the light emitting element may be disposed. The circuit unit may include various thin film transistors, storage capacitors, and lines for driving an organic light emitting element. For example, the circuit unit may include various components such as a driving thin film transistor, a switching thin film transistor, a storage capacitor, a gate line, and a data line, but is not limited thereto.

The circuit unit may include various thin film transistors, capacitors, and lines for driving an electroluminescent device. For example, the circuit unit may include various components such as a driving thin film transistor, a switching thin film transistor, a storage capacitor, a gate line, and a data line, but is not limited thereto.

The non-display area is an area in which an image is not displayed. In the non-display area, circuits, lines, and components for driving the light emitting element of the display area are disposed. A driver IC such as a gate driver IC, a data driver IC or the like may be disposed in the non-display area.

The non-display area may be defined as an area surrounding the display area. However, the non-display area may be defined as an area extending from the display area, or an area in which the light emitting element is not disposed, but is not limited thereto.

Meanwhile, the display panel PNL may be defined as the display area and the non-display area, but may also be defined as the folding area FA and a non-folding area NFA.

The folding area FA is an area in which the display panel PNL is folded, that is, a bendable area. The folding area FA is an area folded with respect to a folding axis FX, and the folding area FA may be folded with a specific radius of curvature. Since the folding area FA is an area in which the display panel PNL is folded, it may be defined as the folding area FA. The folding area FA includes a portion of the non-display area and a portion of the display area adjacent to the folding axis FX.

In FIG. 6, the folding axis FX is shown as being disposed at a center of the display panel PNL, but a position and number of the folding axis FX may be variously changed, and the folding area FA may also be variously changed depending on the position and number of the folding axis FX. However, the present disclosure is not limited thereto.

The non-folding area NFA is an area in which the display panel PNL is maintained in a flat state. The non-folding area NFA includes a portion of the display area and a portion of the non-display area. The non-folding area NFA is an area in which the display panel PNL is not folded, and may be defined as the non-folding area NFA. The non-folding area NFA may be disposed on both sides of the folding area FA. Two non-folding regions NFA may be disposed with the folding region FA interposed therebetween.

The folding area FA may correspond to the first area A1 of the cover window 500. That is, the folding area FA and the first area A1 may be disposed to overlap each other. Also, the folding axis FX may correspond to the central line CL of the first area A1. That is, the folding axis FX and the central line CL of the first area A1 may be disposed to overlap each other. Also, the non-folding areas NFA may correspond to the second areas A2 of the cover window 500. That is, the non-folding areas NFA and the second areas A2 may be disposed to overlap each other.

In FIG. 6, the foldable display device 1000 is illustrated as including only the display panel PNL and the cover window 500, but may further include various other components. For example, the foldable display device 1000 may further include a polarizing plate, a touch panel, and the like between the cover window 500 and the display panel PNL. In addition, the foldable display device 1000 may further include components that facilitate and support folding of the foldable display device 1000, such as a back plate or a plate bottom and the like under the display panel PNL.

The cover window 500 of the foldable display device 1000 according to an exemplary embodiment of the present disclosure may improve folding characteristics and at the same time, allow for easy rework after the use for a predetermined period of time.

The exemplary embodiments of the present disclosure can also be described as follows:

According to an aspect of the present disclosure, there is provided a cover window. The cover window includes a substrate layer. The cover window further includes a hard-coating layer on the substrate layer. The cover window further includes a protective film disposed on the hard-coating layer and including a base film and a plurality of protrusions protruding from the base film. The cover window further includes an adhesive layer disposed on surfaces of the plurality of protrusions and bonding the hard-coating layer and the protective film. The protective film includes a first area and second areas disposed on both sides of the first area. The plurality of protrusions are disposed in the first area. The plurality of protrusions have a shape in which the protrusions disposed on one side and the protrusions disposed on the other side are symmetrical to each other with respect to a central line of the first area.

Each of the plurality of protrusions may include a first surface perpendicular to the base film and a second surface inclined with respect to the first surface and the base film.

An area of the first surface may be smaller than an area of the second surface.

In a cross-sectional view, a length of the first surface may be smaller than a length of the second surface.

The adhesive layer may include a first adhesive layer disposed on the first surfaces and a second adhesive layer disposed on the second surface. An adhesive strength of the first adhesive layer may be greater than an adhesive strength of the second adhesive layer.

The adhesive strength of the first adhesive layer may be 100 gf/inch, and the adhesive strength of the second adhesive layer may be 30 gf/inch to 50 gf/inch.

The first adhesive layer may be attached to a part of the first surface having an area smaller than an area of the first surface.

Each of the plurality of protrusions may have a shape in which the second surface is closer to the central line of the first area as compared to the first surface.

The plurality of protrusions may be disposed in both the first area and the second areas.

A surface of the hard-coating layer may have a shape corresponding to a shape of a surface of the protective film.

According to another aspect of the present disclosure, there is provided a foldable display device. The foldable display device includes the cover window. The foldable display device further includes a display panel disposed under the cover window.

The display panel may include a folding area and non-folding areas on both sides of the folding area. The first area corresponds to the folding area, and the second areas correspond to the non-folding area.

It will be apparent to those skilled in the art that various modifications and variations can be made in the cover window and the foldable display device including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A cover window, comprising:
a substrate layer;
a hard-coating layer on the substrate layer;
a protective film disposed on the hard-coating layer and including a base film and a plurality of protrusions protruding from the base film; and
an adhesive layer disposed on surfaces of the plurality of protrusions and bonding the hard-coating layer and the protective film,
wherein the protective film includes a first area and second areas disposed on both sides of the first area,
wherein the plurality of protrusions are disposed in the first area, and wherein the plurality of protrusions have a shape in which the protrusions disposed on one side and the protrusions disposed on the other side are symmetrical to each other with respect to a central line of the first area.

2. The cover window of claim 1, wherein each of the plurality of protrusions includes a first surface and a second surface, and an angle formed by the first surface and the base film is greater than an angle formed by the second surface and the base film.

3. The cover window of claim 1, wherein the central line of the first area corresponds to a folding axis of the first area.

4. The cover window of claim 2, wherein the first surface is perpendicular to the base film.

5. The cover window of claim 2, wherein an area of the first surface is smaller than an area of the second surface.

6. The cover window of claim 4, wherein in a cross-sectional view, a height of the protrusion in a direction vertical to the base film is smaller than a length of the protrusion in a direction parallel to the base film.

7. The cover window of claim 2, wherein the adhesive layer includes a first adhesive layer disposed on the first surface and a second adhesive layer disposed on the second surface,
wherein an adhesive strength of the first adhesive layer is greater than an adhesive strength of the second adhesive layer.

8. The cover window of claim 7, wherein the adhesive strength of the first adhesive layer is 100 gf/inch, and
the adhesive strength of the second adhesive layer is 30 gf/inch to 50 gf/inch.

9. The cover window of claim 7, wherein the first adhesive layer is attached to a part of the first surface having an area smaller than an area of the first surface.

10. The cover window of claim 2, wherein each of the plurality of protrusions has a shape in which the second surface is closer to the central line of the first area as compared to the first surface.

11. The cover window of claim 1, wherein the plurality of protrusions are disposed in both the first area and the second areas.

12. The cover window of claim 1, wherein a surface of the hard-coating layer has a shape corresponding to a shape of a surface of the protective film.

13. A foldable display device, comprising:
the cover window of claim 1; and
a display panel disposed under the cover window.

14. The foldable display device of claim 12, wherein the display panel includes a folding area and non-folding areas on both sides of the folding area,
wherein the first area corresponds to the folding area, and the second areas correspond to the non-folding area.

* * * * *